United States Patent [19]
Tanizaki et al.

[11] Patent Number: 6,133,887
[45] Date of Patent: Oct. 17, 2000

[54] ANTENNA DEVICE, AND TRANSMITTING/RECEIVING UNIT

[75] Inventors: Toru Tanizaki, Nagaokakyo; Yoshinori Taguchi, Kuse-gun, both of Japan

[73] Assignee: Murata Manufacturing Co., Ltd., Japan

[21] Appl. No.: 09/346,806

[22] Filed: Jul. 2, 1999

[30] Foreign Application Priority Data

Jul. 3, 1998 [JP] Japan .................................. 10-189507

[51] Int. Cl.[7] ............................................. H04B 7/00
[52] U.S. Cl. ........................ 343/754; 333/159; 333/205; 333/256
[58] Field of Search ................................. 343/754, 757, 343/700 MS, 824; 333/111, 152, 159, 205, 256, 236

[56] References Cited

U.S. PATENT DOCUMENTS

| | | | |
|---|---|---|---|
| 3,121,848 | 2/1964 | Kruse et al. | 333/159 |
| 5,389,938 | 2/1995 | Harrison | 343/702 |
| 5,828,344 | 10/1998 | Alder et al. | 343/755 |
| 5,945,946 | 8/1999 | Munger | 342/367 |

*Primary Examiner*—Don Wong
*Assistant Examiner*—James Clinger
*Attorney, Agent, or Firm*—Ostrolenk, Faber, Gerb & Soffen, LLP

[57] ABSTRACT

An antenna device and a transmitting and receiving unit using the device which are capable of simultaneously polarizing each direction of a plurality of beams are provided without increasing the size of the whole device. For example, when the detection is achieved by forming a plurality of beams such as a radar of monopulse type, the angle measurement range is easily extended. A movable part is provided with a plurality of primary radiators and movable part side transmission lines (dielectric strips of NRD guide) to be coupled therewith, and a fixed part side is provided with dielectric lenses to form each focal plane at the position of primary radiators, and fixed part side transmission lines (dielectric strips of NRD guide) to be respectively coupled with the movable part side transmission lines. A plurality of beams are simultaneously tilted by displacing the movable part.

8 Claims, 12 Drawing Sheets

ANTENNA DEVICE, AND TRANSMITTING/ RECEIVING UNIT

BACKGROUND OF THE INVENTION

1. Field of the Invention

The present invention relates to an antenna device to be used in a milliwave band, and a transmitting and receiving unit using it.

2. Description of the Related Art

In a radar using a microwave or a millimeter wave, the monopulse system has been employed as one of angle measurement systems to measure the azimuth of a target.

Figure 13:
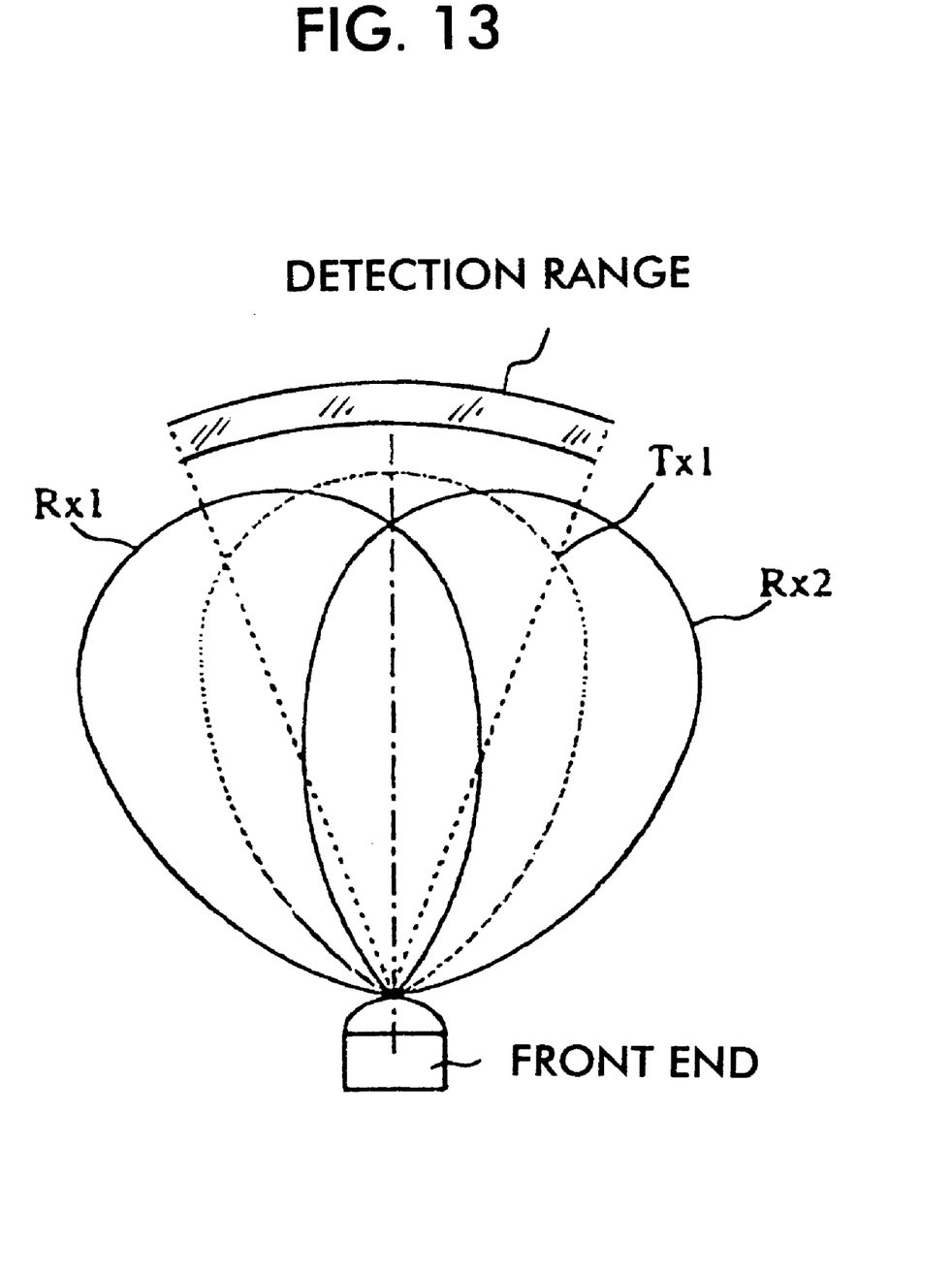
FIG. 13 is a schematic representation of the relationship between three beams of monopulse system and the detection range.
Figure 14A:
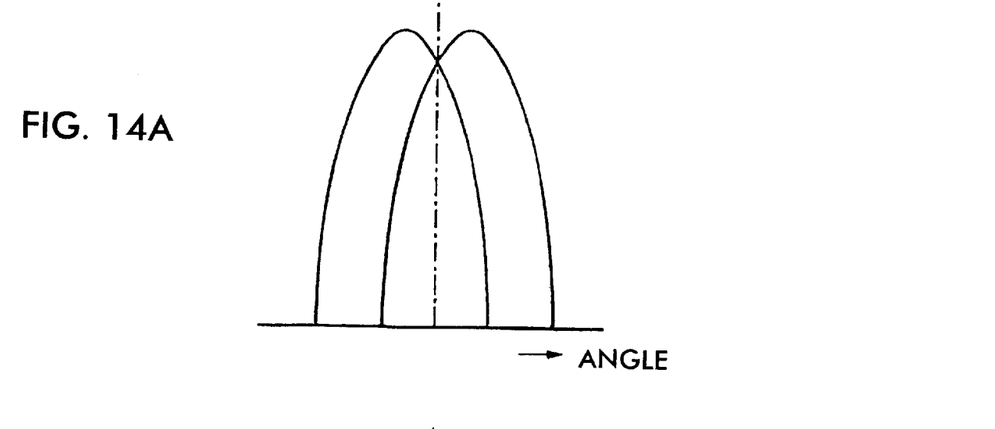
FIGS. 14A, 14B and 14C, is a schematic representation of the principle of monopulse system.
Figure 14B:
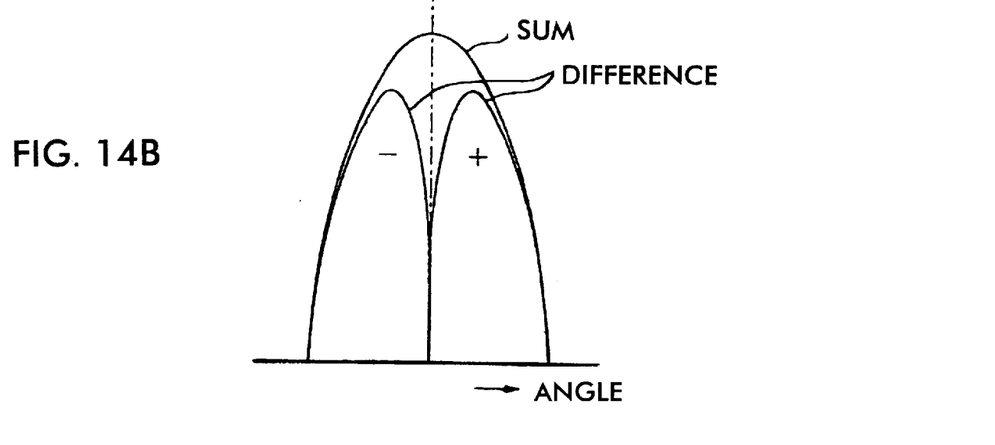
Figure 14C:
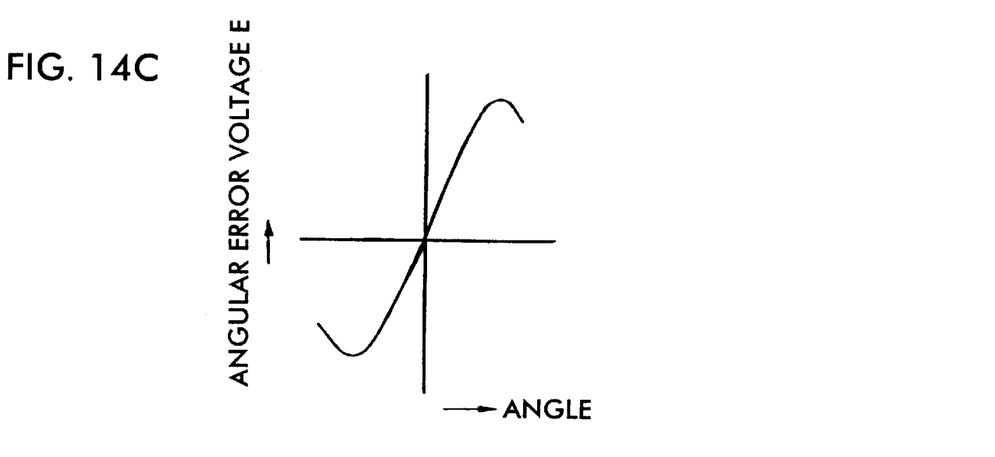

FIG. 13 is a schematic representation of the beam pattern of a radar to achieve the angle measurement by the amplitude-comparison monopulse system. In the figure, TX1 denotes a transmission beam to be transmitted from a front end, and RX1 and RX2 denote reception beams to indicate the direction characteristic of a reception antenna to make reception at a front end. FIG. 14 is a schematic representation of the angle measurement based on two reception signals. FIG. 14A shows the angle on X-axis, and the reception signal intensity on Y-axis. FIG. 14B shows the patterns of the sum component and the difference component of the two beams. The S-shaped characteristic of the error voltage to the angle can be obtained as indicated in FIG. 14C if the ratio of the difference component to the sum component is extracted as the angle error voltage signal $\epsilon$. An approximately straight part of the S-shaped characteristic corresponds to the angle range between the axes of the two reception beams RX1 and RX2 as indicated in FIG. 13. Thus, the azimuth of the target can be detected from the extracted angle error voltage for this detection range.

In an example, when a vehicle is traveling on the road, the above-mentioned monopulse system is applicable to measure the distance and the relative speed to another vehicle traveling forward or backward, and to measure its azimuth, the angle measurement range becomes a problem according to some service intention of a radar. That is, in a case of the monopulse system of the above-mentioned construction, the angle of expansion between the axes of the two reception beams is the angle measurable range. If individual beams are made wider in angle to increase the range, the gain is decreased accordingly, and the measurable distance is reduced. If the angle of expansion between the axes of the two beams is increased without being wider in angle, the angle measurement resolution is degraded.

SUMMARY OF THE INVENTION

Accordingly, it is an object of the present invention to provide a transmitting and receiving unit to easily increase the angle measurement range while keeping the desired detection distance and angle measurement resolution when the detection is made by forming a plurality of beams like a radar of a monopulse system.

In the above-mentioned example, the radar of a monopulse system is described, and in a general practice, when the detection is achieved in the prescribed direction, the whole antenna device is rotated by polarizing the transmitting and reception beams. However, the radar using the antenna device of such a construction is difficult to miniaturize, and limited in service. In particular, when a plurality of beams are formed, and these beams are simultaneously polarized, the whole device is more and more increased in size.

Another object of the present invention is to provide an antenna device capable of simultaneously polarizing various directions of a plurality of beams without increasing the whole device in size, and a transmitting and receiving unit using it.

In the present invention, an antenna device comprises a plurality of primary radiators and movable part side transmission lines to be respectively coupled with these primary radiators on a movable part, providing dielectric lenses in which a plurality of the primary radiators form approximately focal planes, and a plurality of fixed part side transmission lines to be electromagnetically coupled with the movable part side transmission lines on a fixed part, and providing a driving unit to displace the movable part to the fixed part.

In such a construction, by relatively displacing the movable part to the fixed part, a plurality of primary radiators provided on the movable part are displaced in the focal plane of each corresponding dielectric lens, and the direction of the beam to be determined by the relative positional relationship of the primary radiator to the dielectric lens is polarized. Thus, a multi-beam antenna device capable of simultaneously polarizing the respective beams can be obtained. The movable part is only provided with the primary radiators and the movable part side transmission line to be coupled therewith, and the movable part can be miniaturized and reduced in weight, and the movable part can be displaced at high speed even when a motor, etc., of low torque is used. In addition, the whole antenna device can be miniaturized and reduced in weight because the whole antenna device need not be turned.

In the present invention, a multi-beam transmitting and receiving unit is constituted by connecting a transmission circuit and a reception circuit to a plurality of fixed part side transmission lines of the above-mentioned antenna device.

Further, in this present invention, at least three antenna devices are provided, the transmission circuit is connected to the fixed part side transmission line of one of the antenna devices, reception circuits are connected to the fixed part side transmission line of the other two antenna devices, the axes of the reception beams of the two antenna devices to which the transmission circuits are connected are different from each other, and the axis of the transmission beam of the antenna device to which the transmission circuit is connected is located approximately at a center of the two reception beams to determine the positional relationship between the respective primary radiators and dielectric lenses of the three antenna devices.

In such a construction, two reception beams of different axes from each other, and the transmission beam located approximately at a center of the two reception beams are formed, and these beams are polarized on the whole by the relative displacement of the movable part to the fixed part. Thus, the angle measurement can be achieved over an extensive range on the whole through the angle measurement by the monopulse system and through the simultaneous polarization of these beams.

Still further, in the present invention, at least the two antenna devices are provided, the transmission circuit and the reception circuit are respectively connected to the fixed part side transmission line of these antenna devices, and the axis of the transmission beam of the antenna device to which the transmission circuit is connected approximately agrees with the axis of the reception beam of the antenna device to which the reception circuit is connected. Thus, the axes of the separately-provided transmission beam and reception beam can be simultaneously polarized in a condition where the axes of the beams agree with each other by displacing the single movable part.

BRIEF DESCRIPTION OF THE DRAWING(S)

FIG. 1, comprising

FIG. 2, comprising

FIG. 4, comprising

FIG. 5, comprising

FIG. 6, comprising

FIG. 9, comprising

FIG. 12, comprising

FIG. 14, comprising

DETAILED DESCRIPTION OF EMBODIMENTS OF THE INVENTION

The construction of an antenna device of a first embodiment of the present invention will now be described with reference to FIGS. 1 through 4.

Figure 1A:
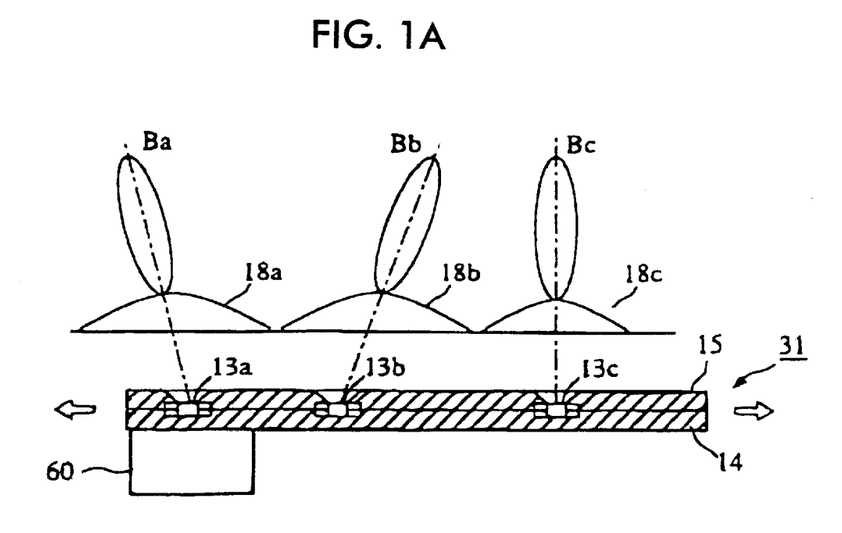
FIGS. 1A and 1B, is a schematic representation of an antenna device of a first embodiment.
Figure 1B:
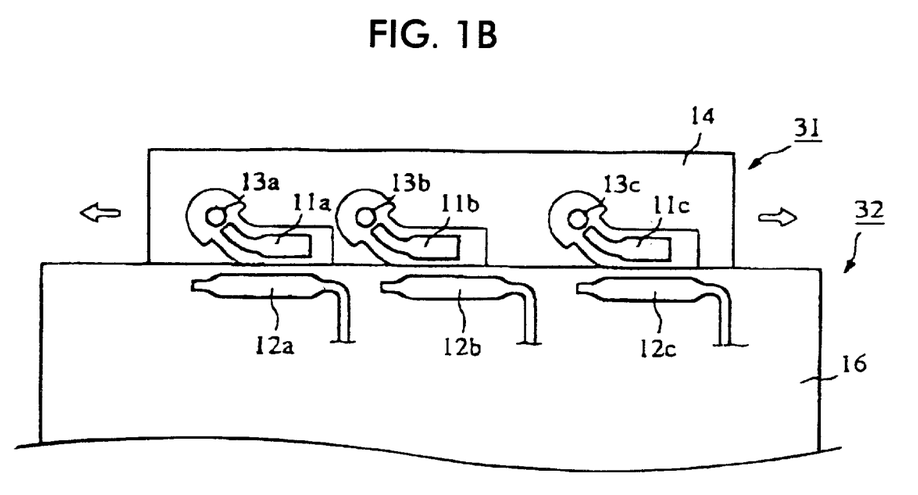

FIG. 1A is a section of a main part, and FIG. 1B is a top plan view illustrating the constitution of a fixed part and a movable part in a condition where an upper conductor plate comprising a below-mentioned non-radiant dielectric guide is detached. In the figures, reference 32 denotes the fixed part, and reference 31 denotes the movable part to be displaced in the right-to-left direction in the figure relative to the fixed part 32. The movable part 31 is provided with three primary radiators denoted by 13a, 13b and 13c. References 18a, 18b and 18c denote dielectric lenses which are respectively provided on the fixed part side, and are arranged so that the above-mentioned radiators 13a, 13b and 13c are located within each focal plane. 60 denotes a drive part to displace the movable part 31 in the right-to-left direction in the figure, and the axial direction (azimuth) of beams Ba, Bb and Bc to be determined by the positional relationship between the primary radiators 13a, 13b and 13c and the dielectric lenses 18a, 18b and 18c, are changed by the displacement of the movable part 31.

In the movable part 31, dielectric strips denoted by references 11a, 11b and 11c are arranged between upper and lower conductor plates 14 and 15 comprising a non-radiant dielectric guide (hereinafter, referred to as "NRD guide"). As mentioned below, one end of the dielectric strips 11a, 11b and 11c forms an NRD circuit to transmit the single mode of the LSM01 mode (hereinafter, referred to as "hyper NRD guide"), and the primary radiators 13a, 13b and 13c which are dielectric resonators, are coupled with an end part. In the fixed part 32, the dielectric strips 12a, 12b and 12c are arranged between upper and lower conductor plates comprising the NRD guide.

Figure 2A:
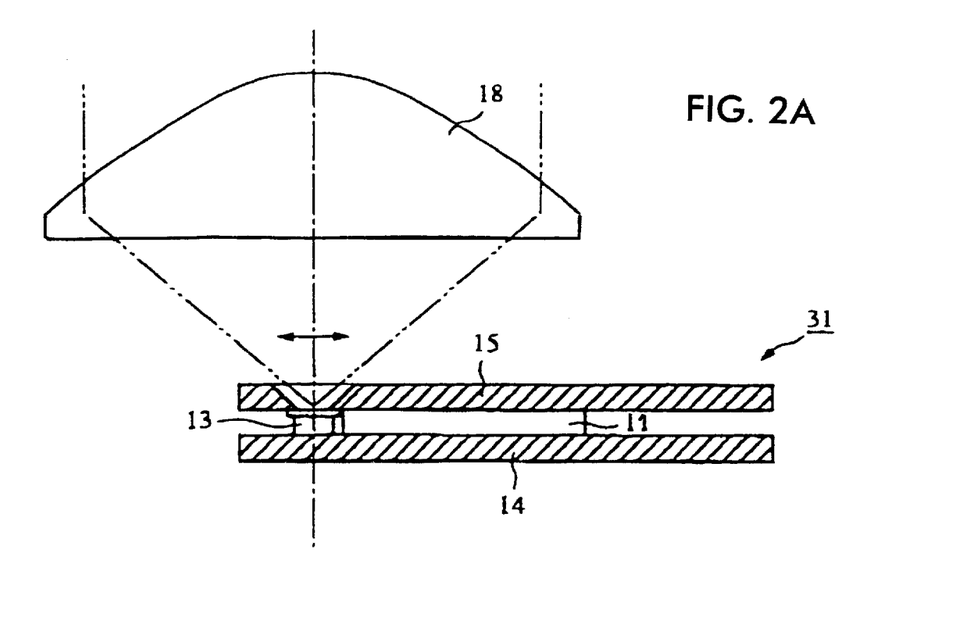
FIGS. 2A and 2B, is a schematic representation of a directional coupler and a movable part of the antenna device.
Figure 2B:
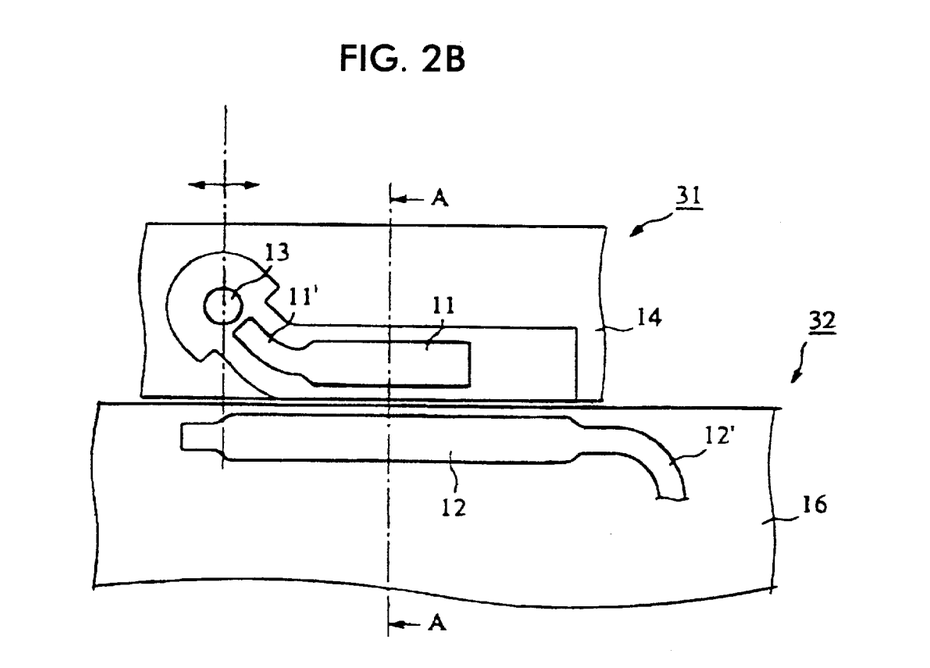

FIG. 2 is a schematic representation of the construction of the above-mentioned directional coupler and the relationship between the primary radiators and the dielectric lenses, and FIG. 2A is a partly sectioned view of the movable part, and FIG. 2B is a top plan view of the movable part in a condition where the upper conductor plate comprising the NRD guide is detached.

In FIG. 2B, end faces of the respective conductor plates of the NRD guide on the movable part 31 side and the NRD guide on the fixed part 32 side are arranged in a non-contact condition with the prescribed interval. The dielectric strips 11 and 12 of both NRD guides are arranged parallel to each other in the vicinity of the end faces of the conductor plates 14,16, and close to each other. In such a construction, a directional coupler is constituted by coupling the NRD guide on the fixed part side with the NRD guide on the movable part side.

In parts denoted by 11' and 12' in FIG. 2, the interval between the conductor plates 14 and 15 is smaller than the height of these dielectric strips to constitute a hyper NRD guide to transmit the single mode of the LSM01 mode. This hyper NRD guide is characterized in that the bend radius of a curved line can be freely set, and the directional coupler can be easily connected to an external circuit. The whole device can be miniaturized thereby.

The primary radiator 13 comprises a columnar dielectric resonator, and makes use of e.g., the resonance mode of the HE111 mode. As illustrated in FIG. 2A, an opening part having a horn-shaped tapered part concentric with the primary radiator 13 part is formed in the upper conductor plate 15. A slit plate where slits are formed in the conductor plate is held between the primary radiator 13 and the opening part as illustrated in the figure. The electromagnetic wave is propagated in the dielectric strip 11' in the LSM mode having the electric field component in the direction orthogonal to the longitudinal direction of the dielectric strip 11' and parallel to the conductor plates 14 and 15, and having the magnetic field component in a direction perpendicular to the conductor plates 14 and 15. Then, the dielectric strip 11' is electromagnetically coupled with the primary radiator 13, and the HE111 mode having the electric field component in the same direction as the electric field of the dielectric strip 11' is generated in the primary radiator 13. As a result, the linearly polarized electromagnetic wave is radiated in the direction perpendicular to the conductor plate 14 through the above-mentioned opening part. The prescribed beam is formed on the dielectric lens 18 by converging the linearly polarized electromagnetic wave. On the other hand, when the electromagnetic wave is incident from the opening part through the dielectric lens, the primary radiator 13 is excited in the HE111 mode, and the electromagnetic wave is propagated in the LSM mode to the dielectric strip 11' to be coupled therewith. In this example, the parts of the dielectric strips 11' and 12' are formed of the hyper NRD guide, and they can comprise a regular NRD guide (where the height of the dielectric strip is equal to the interval of the upper and lower conductor plates).

Figure 3:
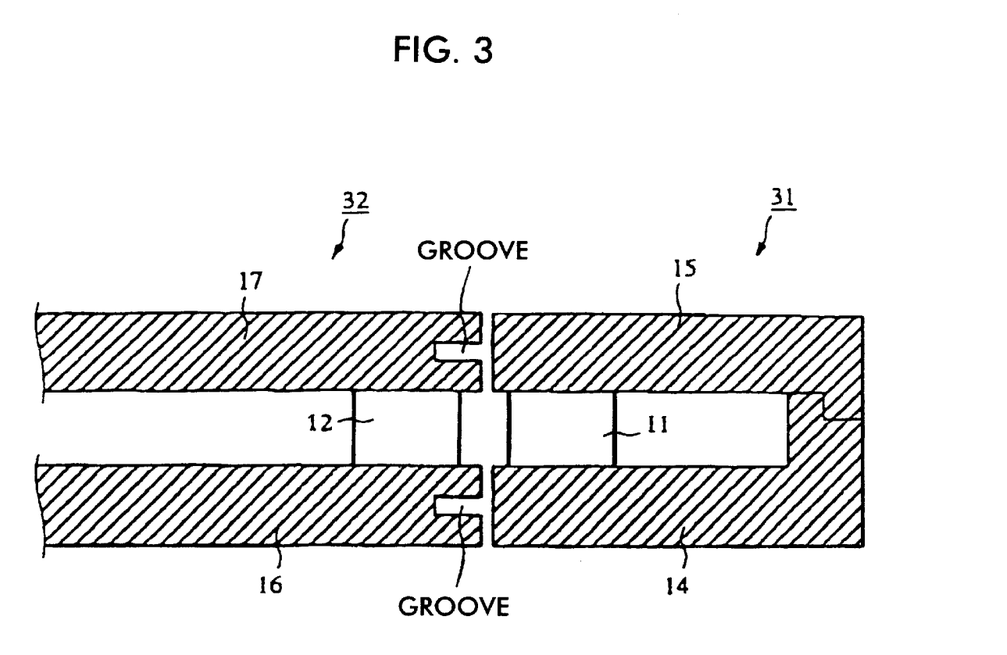
FIG. 3 is a sectional view of the directional coupler part.

FIG. 3 is a sectional view taken along the line A—A of FIG. 2B. The NRD guide on the movable part 31 side comprises the upper and lower conductor plates 14 and 15 and the dielectric strip 11 therebetween, while the NRD guide on the fixed part 32 side comprises the upper and lower conductor plates 16 and 17 and the dielectric strip 12 therebetween. The end faces of the conductor plates of both NRD guides are arranged opposite to each other with the prescribed interval therebetween, and a prescribed groove extending in the direction parallel to these conductor plates 16 and 17 is formed in the end faces of the conductor plates 16 and 17. The groove is of the choke structure and works as equivalently connected electrode surfaces of the conductor plates (opposite surfaces of two conductor plates). The groove may be provided on the conductor plates 14 and 15 side.

Figure 4A:
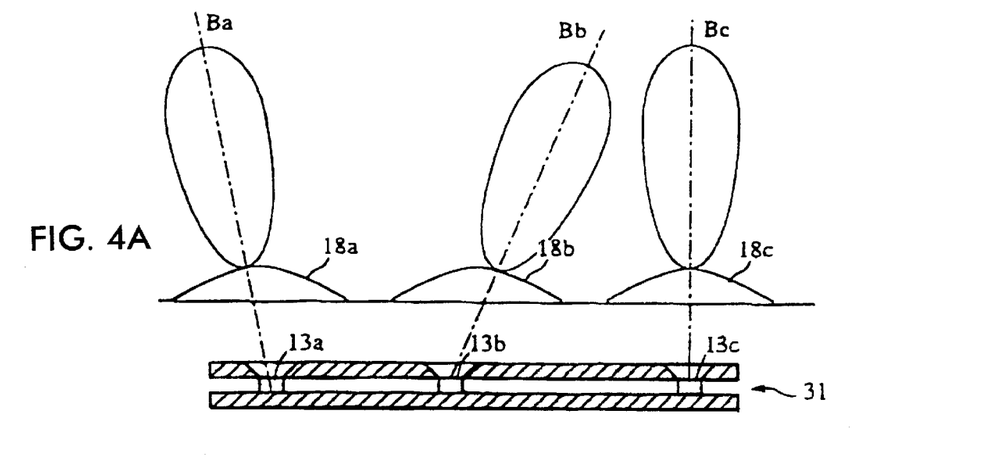
FIGS. 4A, 4B and 4C, is a schematic representation of the tilt of each beam by the displacement of the movable part.
Figure 4B:
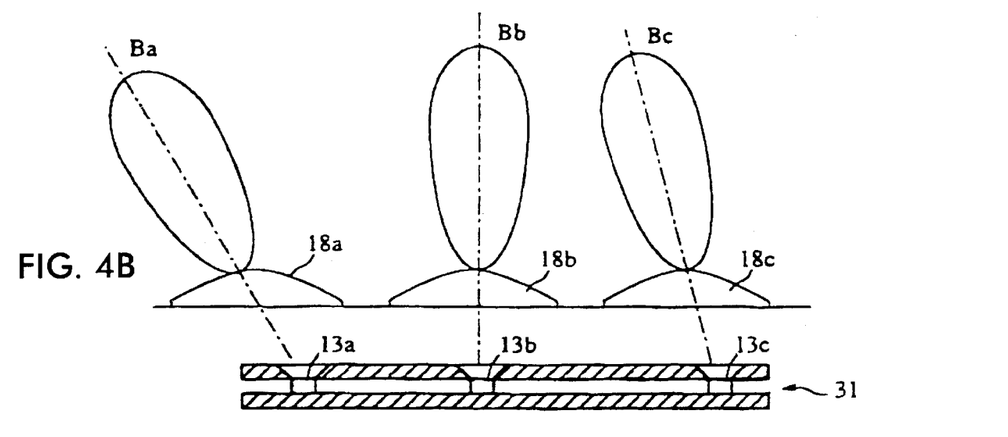
Figure 4C:
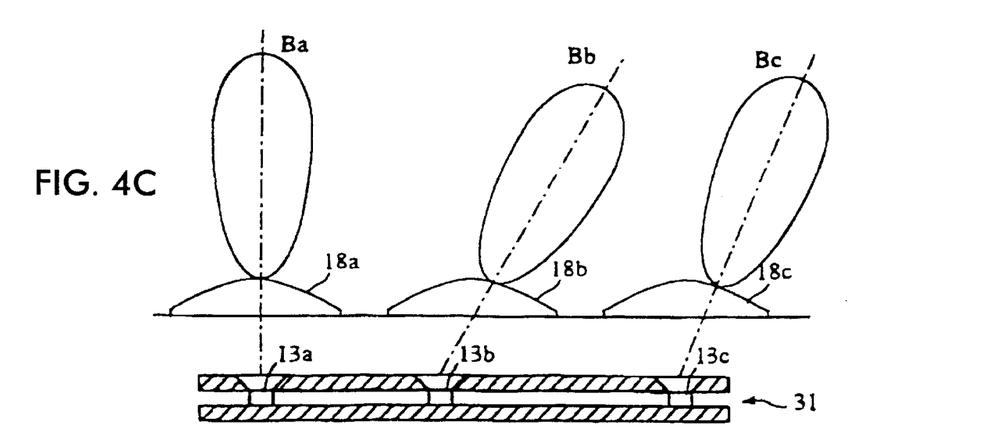

FIG. 4 illustrates an example of the beam change by the displacement of the movable part 31. In the condition of FIG. 4A, the transmission beam Bc is directed in the forward direction of 0°, one reception beam Ba is tilted to the left side, e.g., to the direction of 15°, and the other reception beam Bb is tilted to the right by 15°. When the movable part 31 is displaced from this condition to the right direction in the figure, and reaches the condition in FIG. 4B, the transmission beam Bc is tilted to the left direction by 15°, one reception beam Ba is tilted to the left direction by 30°, and the other reception beam Bb is directed in the forward direction of 0°. On the other hand, when the movable part 31 is displaced to the left and reaches the condition in FIG. 4C, the transmission beam Bc is tilted to the right by 15°, one reception beam Ba is directed in the forward direction of 0°, and the other reception beam Bb is tilted to the right by 30°.

Only by displacing a single movable part, the direction of three beams can thus be simultaneously polarized.

When a transmitting and receiving unit is constituted using the above-mentioned antenna device, a transmission circuit and a reception circuit may be connected to each port of the NRD guides 12a, 12b and 12c as the fixed part side transmission line illustrated in FIG. 1.

The construction of an antenna device of a second embodiment of the present invention is described with reference to FIGS. 5 through 7.

Figure 5A:
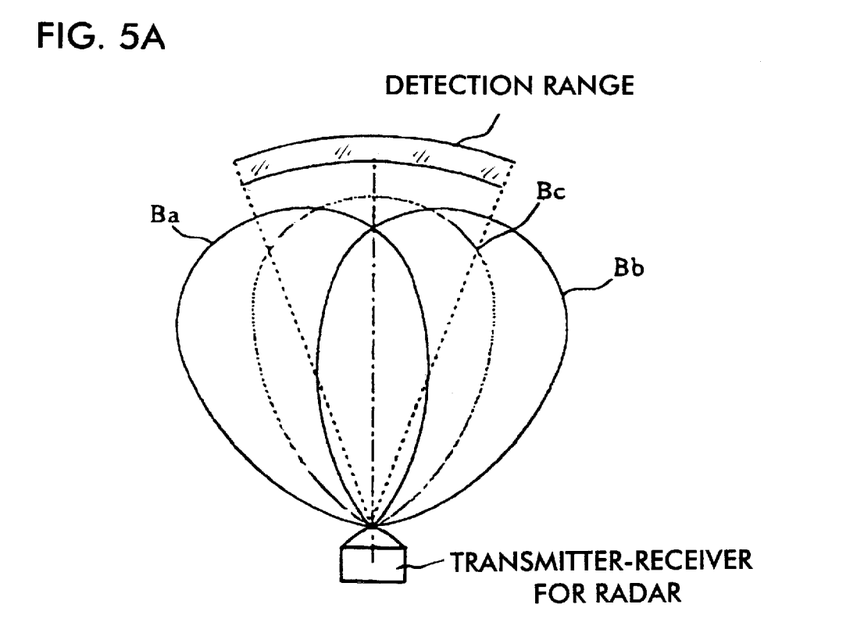
FIGS. 5A and 5B, is a schematic representation of the relationship between each beam and the tilt angle of the beam relative to the offset of the movable part of a transmitting and receiving unit for radar of a second embodiment.

The antenna device to be used in the second embodiment is basically the same as that illustrated in the first embodiment. FIG. 5A is a detection range in achieving the angle measurement by the monopulse system using two reception beams Ba and Bb and one transmission beam Bc.

Figure 5B:
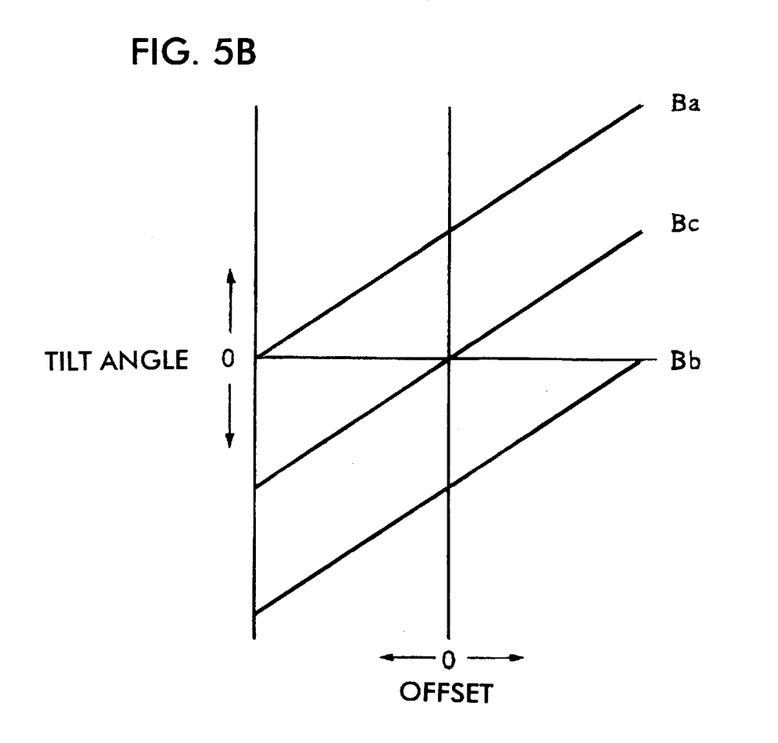

FIG. 5B shows a relationship of the beam polarization to the displacement of the movable part. Here, "offset" is the displacement of the primary radiator relative to the optical axis of the dielectric lens, and "tilt angle" is the angle to indicate the direction of the beam with the forward direction of the antenna device being 0°. In this embodiment, different offsets are specified in advance for three antennas, and three beams are changed by an equal angle according to the displacement of the movable part while keeping the relationship of the tilt angle corresponding to each offset.

Figure 6A:
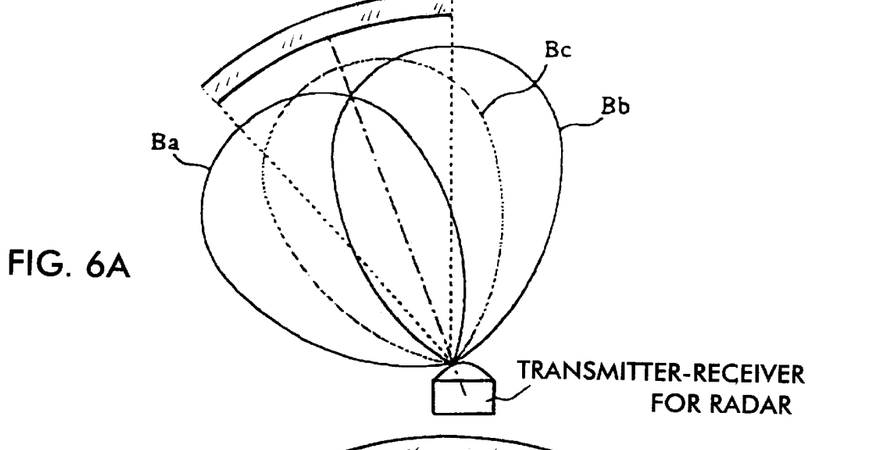
FIGS. 6A, 6B and 6C, is a schematic representation of the change in the detection range when the beam is tilted.
Figure 6B:
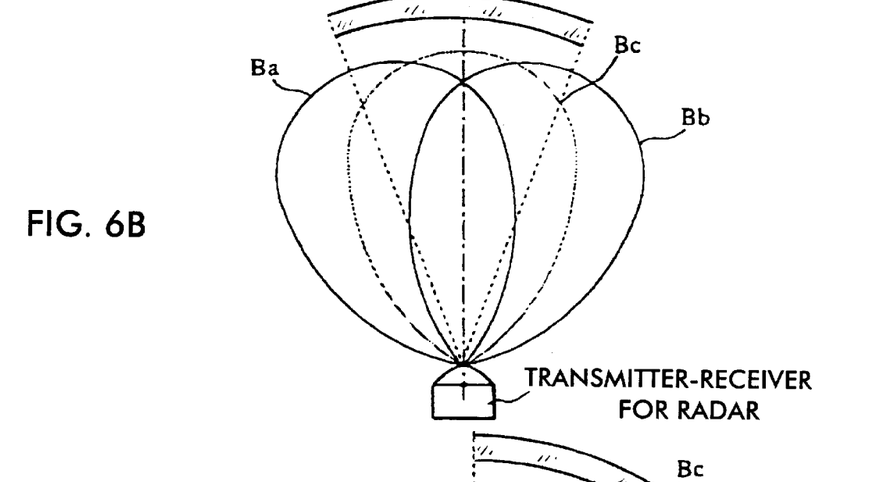
Figure 6C:
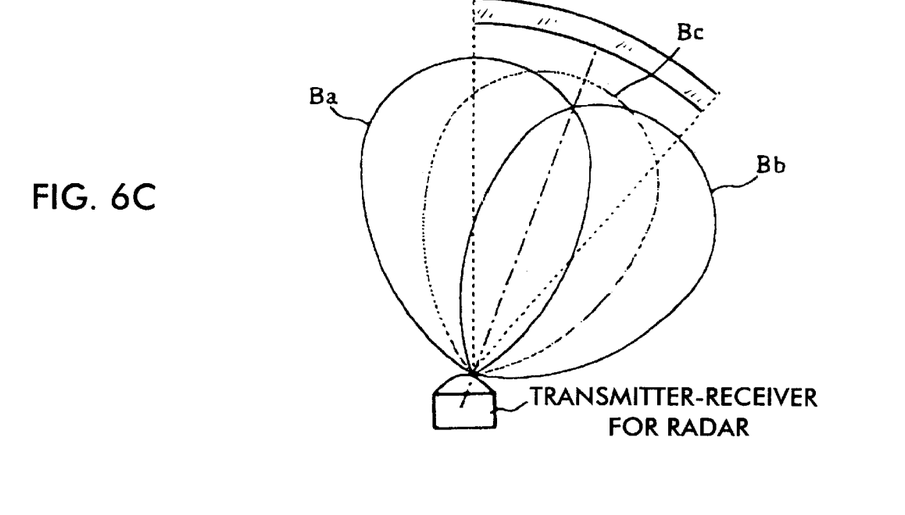

FIG. 6 is a schematic representation of the tilt of three beams by the displacement of the above-mentioned movable part. In the condition of FIG. 6A, the axis of the transmission beam Bc is tilted from the forward direction to the left by approximately 15°, and the angle measurement is achieved in the right-to-left direction around the direction, e.g., in the range of ±15°. In the condition of FIG. 6B, the axis of the transmission beam Bc is directed in the forward direction of 0°, and the angle measurement is achieved in the right-to-left direction in the range of ±15°. In the condition of FIG. 6C, the axis of the transmission beam Bc is tilted from the forward direction to the right by approximately 15°, and the angle measurement is achieved in the right-to-left direction around the direction in the range of ±15°. The angle measurement is thus achieved over an extensive range by polarizing the transmission beam and the reception beams over the whole range.

Figure 7:
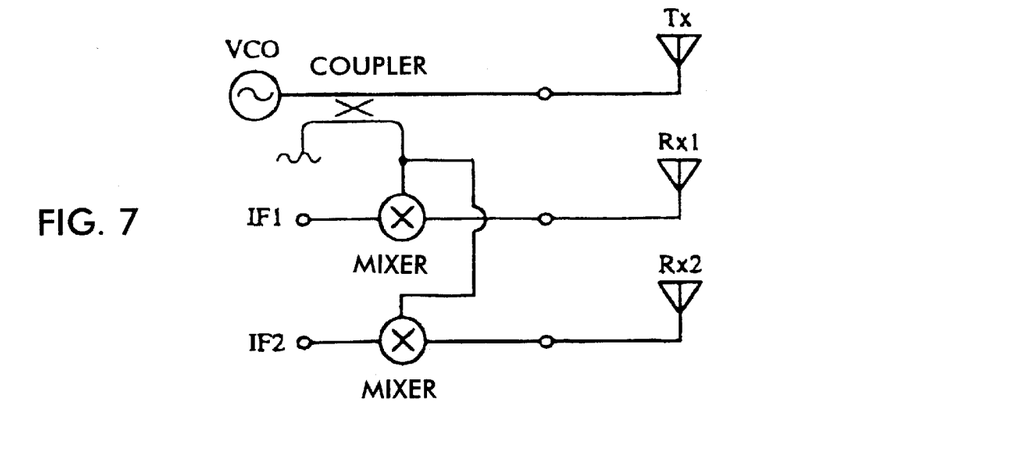
FIG. 7 is an equivalent circuit diagram of the transmitting and receiving unit for radar.

FIG. 7 is an equivalent circuit diagram of the transmitting and receiving unit for radar. TX denotes a transmission antenna comprising a primary radiator to form the transmission beam Bc and a dielectric lens, RX1 and RX2 denote reception antennas comprising two primary radiators to form reception beams Ba and Bb and two dielectric lenses. VCO denotes an oscillator in which the oscillation frequency is changed according to the control voltage, and transmits the transmission signal from the transmission antenna TX through the NRD guide. A mixer is a circuit to achieve the mixing of the transmission signal with the local signal, and the transmission signal received by each primary radiator of the transmission antennas RX1 and RX2 is received from each port through the NRD guide, and a part of the transmission signal taken out through a coupler is respectively received from the other port as the local signal. The mixer outputs the differential frequency component between the local signal and the reception signal as intermediate frequency signals IF1 and IF2. In a reception circuit, the angle measurement is achieved by the monopulse system based on the sum signal and the difference signal of the intermediate frequency signals IF1 and IF2. The angle of azimuth of the target is obtained from the relationship between the angle measurement information obtained by this monopulse system and the tilt angles of three beams in that condition. That is, the value of the tilt angle of the transmission beam Bc added to the angle obtained by the monopulse system is obtained as the information on azimuth of the target forward of the transmitting and receiving unit for radar.

The construction of an antenna device of a third embodiment of the present invention will now be described with reference to FIGS. 8 through 10.

Figure 8A:
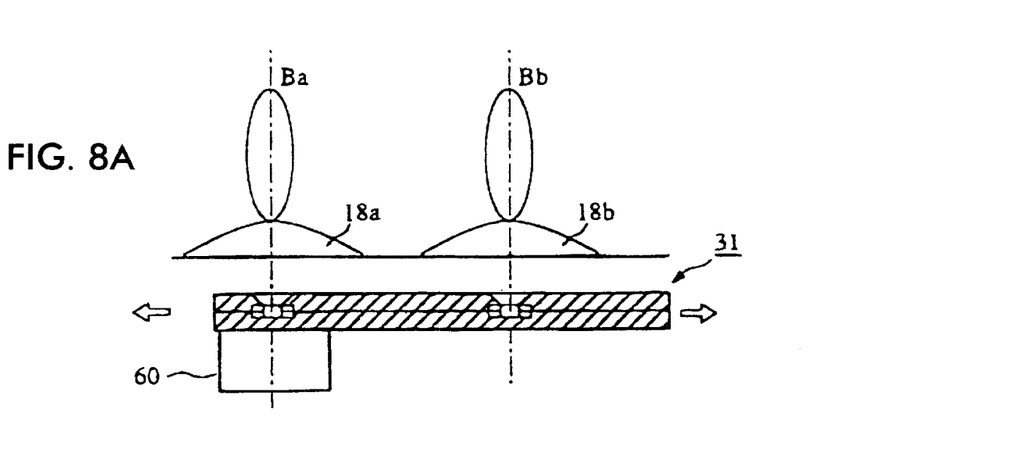
FIG. 8 is a schematic representation of the antenna device of a third embodiment.
Figure 8B:
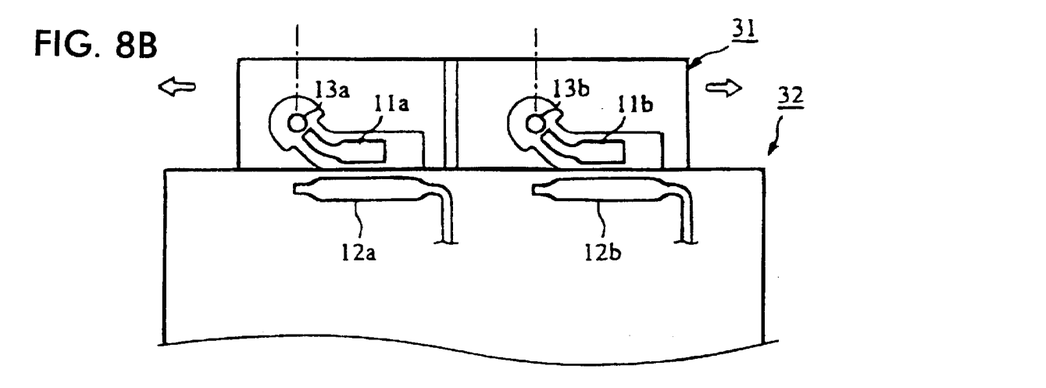

FIG. 8A is a sectional view of a main part, and FIG. 8B is a top plan view illustrating the construction of a fixed part and a movable part in a condition where an upper conductor plate is detached. Here, two NRD guides by the dielectric strips 11a and 11b, and the primary radiators 13a and 13b coupled with each of them are provided on the movable part side, two NRD guides by the dielectric strips 12a and 12b are provided on the fixed part side, and a directional coupler is constituted by the NRD guides on the movable part side, and the NRD guides on the fixed part side. The dielectric lenses 18a and 18b whose focal plane is located at the primary radiators 13a and 13b are provided on the fixed part side.

In FIG. 8, the primary radiator 13a and the dielectric lens 18a constitute a reception antenna, while the primary radiator 13b and the dielectric lens 18b constitute a transmission antenna. Different from the example in FIG. 1, the tilt angle of the transmission beam is equal to that of the reception beam. Thus, the transmission beam Bb and the reception beam Ba are polarized constantly at the equal angle by displacing the movable part 31 in the right-to-left direction in the figure by a driving part 60.

Figure 9A:
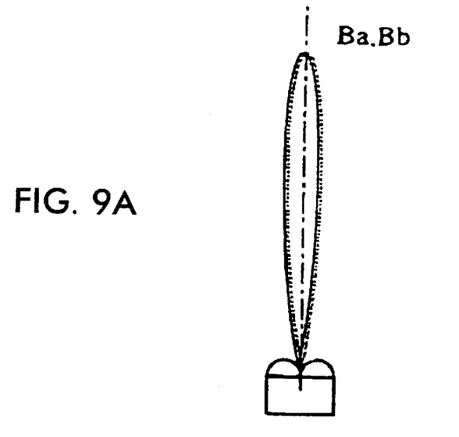
FIGS. 9a, 9B and 9C, is a schematic representation of the tilt of two beams by the displacement of the movable part.
Figure 9B:
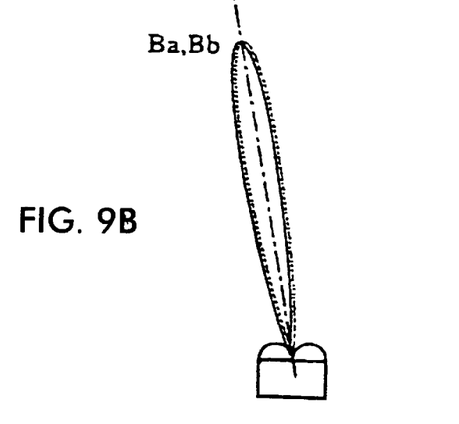
Figure 9C:
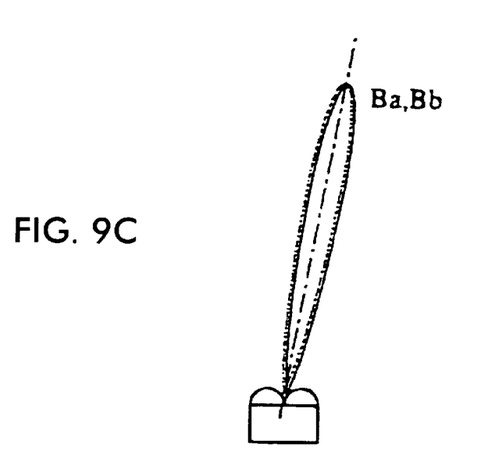

FIG. 9 is a schematic representation of the tilt of two beams by the displacement of the above-mentioned movable parts. In the condition of FIG. 9A, both the transmission beam Bb and the reception beam Ba are directed in the forward direction of 0°, and the range of, e.g., ±2° in the right-to-left direction around the direction is detected. In the condition of FIG. 9B, the transmission beam Bb and the reception beam Ba are tilted to the left by 10°, and the range of ±2° in the right-to-left direct-on around the direction is detected. In the condition of FIG. 9C, the transmission beam Bb and the reception beam Ba are tilted to the right by 10°, and the range of ±2° in the right-to-left direction around the direction is detected. The angle measurement is achieved over an extensive range by polarizing the transmission beam and the reception beam on the whole.

Figure 10:
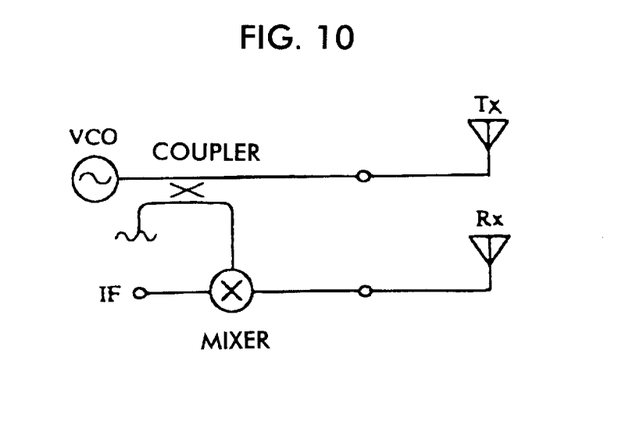
FIG. 10 is an equivalent circuit diagram of the transmitting and receiving unit for radar.

FIG. 10 is an equivalent circuit diagram of a transmitting and receiving unit for radar. TX denotes a transmission antenna comprising primary radiators to form the transmission beam Bb and a dielectric lens, and RX denotes a reception antenna comprising primary radiators to form the reception beam Ba and a dielectric lens. VCO denotes an oscillator in which the oscillation frequency is changed according to the control voltage, and the transmission signal is transmitted from the transmission antenna TX through the NRD guide. In the case of an FM-CW system, the oscillation frequency is changed into a triangular waveform. A mixer is a circuit to achieve the mixing of the reception signal with the local signal. The reception signal received by the primary radiators of the reception antenna RX is received from one port through the NRD guide, and a cart of the transmission signal taken out through the coupler is inputted from the other port as the local signal. The mixer outputs the differential frequency component between the local signal and the reception signal as the intermediate frequency signal IF. In the case of an FM-CW system, the reception circuit detects the relative speed to and the distance from the target from the frequency of the intermediate frequency signal IF and its change.

In such a manner, if the transmission beam and the reception beam are individually provided, a circulator is dispensed with, the isolation of the transmission/reception can be easily increased, and further, by displacing the single movable part, the tilt angle of the transmission beam is constantly the same as that of the reception beam, and the detection in the prescribed direction can be achieved.

Figure 11:
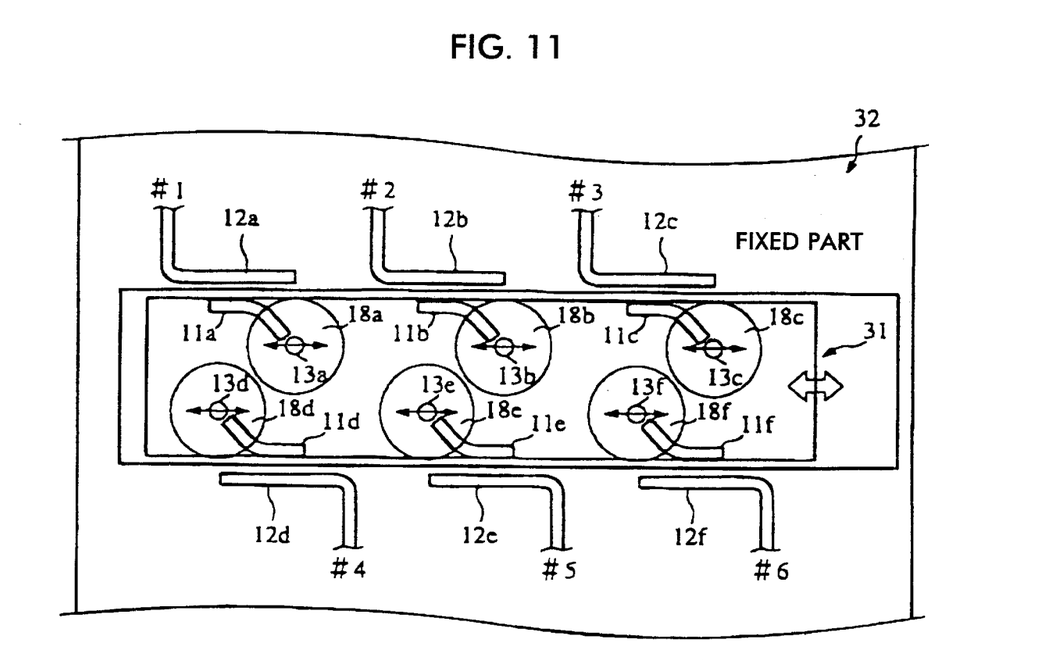
FIG. 11 is a schematic representation of the antenna device of a fourth embodiment.

FIG. 11 is a construction of the antenna device of the third embodiment. In this example, the movable part 31 is provided with six primary radiators denoted by 13a–13f, and dielectric strips 11a–11f of the NRD guides to be coupled therewith. Dielectric strips 12a–12f of the NRD guide comprising the directional coupler to be coupled with the NRD guide on the above-mentioned drive part side 32. Dielectric lenses 18a–18f are provided at the position where the primary radiators 13a–13f are displaced on each focal plane are provided on the fixed part side. In such a construction, six beams can be simultaneously tilted by displacing the driving part 31 in the arrow direction in the figure. When the transmitting and receiving unit is constituted using this antenna device, the transmission circuit or the reception circuit may be connected to the ports #1 to #6 of the dielectric strips 12a–12f of the NRD guide on the fixed part side.

Figure 12A:
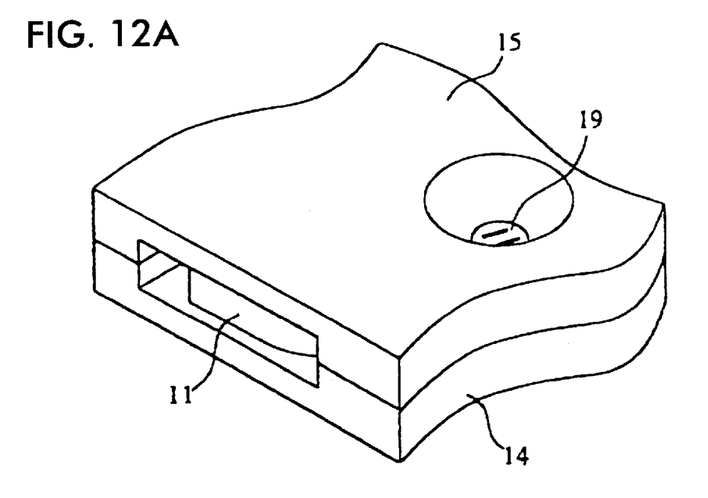
FIGS. 12A, 12B and 12C, is a schematic representation of an NRD guide of the movable part and a primary radiator of a fifth embodiment.
Figure 12B:
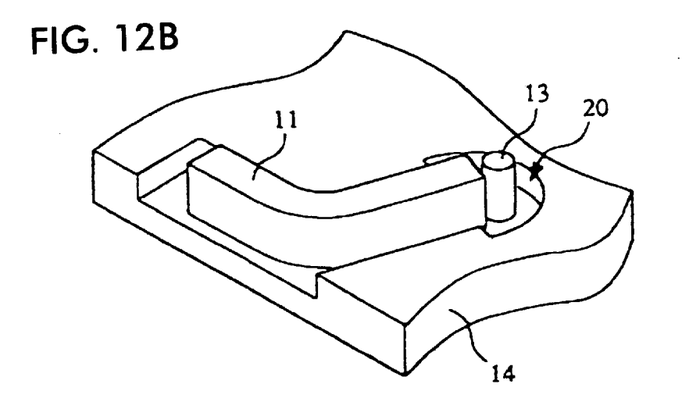
Figure 12C:
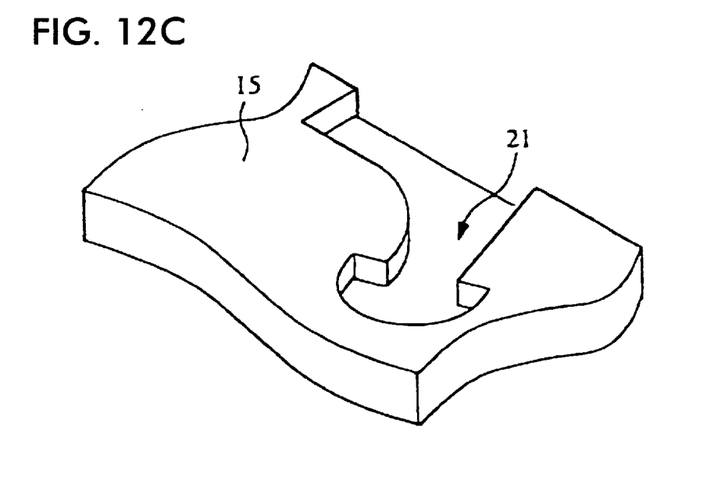

Next, an example of construction of the NRD guide of the movable part and the primary radiators is explained with reference to FIG. 12. FIG. 12A is a partial perspective view, FIG. 12B is a perspective view of the condition of FIG. 12A with the upper conductor plate detached, and FIG. 12C is a perspective view of a back side of the upper conductor plate 15. Grooves 20 and 21 are respectively formed in an inner surface of the upper and lower plates 14 and 15 of the NRD guide on the movable part side, and the dielectric strip 11 and the primary radiator 13 are arranged in a center part of the grooves. That is, cavity parts are formed opposite to the grooves 20 and 21, and the dielectric strip 11 and the primary radiator 13 are arranged in the cavities.

The NRD guide comprises the dielectric strip 11 and the upper and lower conductor plates 14 and 15, and a left proximal surface in FIG. 12A is coupled with the NRD guide on the fixed part side to constitute the directional coupler. An opening part is formed at the position of the conductor plate 15 corresponding to an upper part of the primary radiator 13, and a slit plate 19 is held between the opening part and the primary radiators 13. The cavities formed of the grooves 20 and 21 are provided ensuring the range not to adversely affect the operation of the NRD guide and the primary radiator. For example, in the case of 60 GHz band, the grooves 20 and 21 are provided away from the dielectric strip in the width direction by at least 2 mm, and away from the primary radiator in a radial direction by at least 8 mm.

Necessary sets of the above-mentioned NRD guide and primary radiator are provided on the movable part. Because the upper and lower conductor plates 14 and 15 are abutted in an area except for the grooves 20 and 21, adjacent NRD guides, or adjacent primary radiators are not connected to each other, or the NRD guide and the primary radiator adjacent thereto are not connected to each other. That is, the isolation is ensured. Thus, the sets of the NRD guide and the primary radiator can be arranged close to each other, and a large number of primary radiators and NRD guides can be provided in a small movable part.

According to a first aspect of the invention, a multi-beam antenna device where a plurality of beams are simultaneously polarized can be obtained only by relatively displacing a single movable part to a fixed part. Only a primary radiator and a movable part side transmission line to be coupled thereto may be provided on the movable part side, and the movable part can be miniaturized and reduced in weight, and the movable part can be displaced at high speed even when a low-torque motor, etc. is used. In addition, the whole antenna device can be miniaturized and reduced in weight because it need not be turned.

According to a second aspect of the invention, a miniaturized and multi-beam type transmitting and receiving unit can be obtained.

According to a third aspect of the invention, the angle measurement can be achieved over an extensive range through the monopulse system and through simultaneous polarization of the whole beams.

According to a fourth aspect of the invention, the separately-provided transmission beam and reception beam can be simultaneously polarized while their axes are aligned with each other by displacing the single movable part, and the detection direction can be easily changed while keeping the isolation of transmission from reception.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An antenna device comprising a plurality of primary radiators; a plurality of movable part side transmission lines respectively coupled with said primary radiators, the movable part side transmission lines and primary radiators being provided on a movable part, a plurality of dielectric lenses in which a plurality of said primary radiators form approximately focal planes, and a plurality of fixed part side transmission lines electromagnetically coupled with said movable part side transmission lines and being provided on a fixed part, and a driving unit to displace said movable part with respect to said fixed part.

2. A transmitting and receiving unit comprising:

an antenna device comprising a plurality of primary radiators; a plurality of movable part side transmission lines respectively coupled with said primary radiators, the movable part side transmission lines and primary radiators being provided on a movable part, a plurality of dielectric lenses in which a plurality of said primary radiators form approximately focal planes, and a plurality of fixed part side transmission lines electromagnetically coupled with said movable part side transmission lines and being provided on a fixed part, and a driving unit to displace said movable part with respect to said fixed part; and a transmission circuit and a reception circuit connected to a plurality of said fixed part transmission lines.

3. A transmitting and receiving unit provided with at least three antenna devices, each antenna device comprising a plurality of primary radiators, a plurality of movable part side transmission lines respectively coupled with said primary radiators, the movable part side transmission lines and primary radiators being provided on a movable part, a plurality of dielectric lenses in which a plurality of said primary radiators form approximately focal planes, and a plurality of fixed part side transmission lines electromagnetically coupled with said movable part side transmission lines and being provided on a fixed part, and a driving unit to displace said movable part with respect to said fixed part; and wherein a transmission circuit is connected to the fixed part side transmission lines of one of the antenna devices, reception circuits are connected to the fixed part side transmission lines of the other two antenna devices, axes of reception beams of the two antenna devices to which said transmission circuits are connected being different from each other, and an axis of a transmission beam of an antenna device to which said transmission circuit is connected being located approximately at a center of said reception beams to determine a positional relationship between the respective primary radiators and dielectric lenses of said three antenna devices.

4. A transmitting and receiving unit provided with at least two antenna devices, each antenna device comprising a plurality of primary radiators, a plurality of movable part side transmission lines respectively coupled with said primary radiators, the movable part side transmission lines and primary radiators being provided on a movable part, a plurality of dielectric lenses in which a plurality of said primary radiators form approximately focal planes, and a plurality of fixed part side transmission lines electromagnetically coupled with said movable part side transmission lines and being provided on a fixed part, and a driving unit to displace said movable part with respect to said fixed part; and wherein a transmission circuit and a reception circuit are respectively connected to the fixed part side transmission lines of said antenna devices, and an axis of a transmission beam of an antenna device to which said transmission circuit is connected is approximately in agreement with an axis of a reception beam of an antenna device to which said reception circuit is connected.

5. An antenna device comprising a plurality of primary radiators; a plurality of first part side transmission lines respectively coupled with said primary radiators, the first part side transmission lines and primary radiators being provided on a first part, a plurality of dielectric lenses in which a plurality of said primary radiators form approximately focal planes, and a plurality of second part side transmission lines electromagnetically coupled with said first part side transmission lines, and a driving unit to displace said first part with respect to said second part.

6. A transmitting and receiving unit comprising:

an antenna device comprising a plurality of primary radiators; a plurality of first part side transmission lines respectively coupled with said primary radiators, the first part side transmission lines and primary radiators being provided on a first part, a plurality of dielectric lenses in which a plurality of said primary radiators form approximately focal planes, and a plurality of second part side transmission lines electromagnetically coupled with said first part side transmission lines and being provided on a second part, and a driving unit to displace said first part with respect to said second part; and a transmission circuit and a reception circuit connected to a plurality of said second part transmission lines.

7. A transmitting and receiving unit provided with at least three antenna devices, each antenna device comprising a plurality of primary radiators; a plurality of first part side transmission lines respectively coupled with said primary radiators, the first part side transmission lines and primary radiators being provided on a first part, a plurality of dielectric lenses in which a plurality of said primary radiators form approximately focal planes, and a plurality of second part side transmission lines electromagnetically coupled with said first part side transmission lines and being provided on a second part, and a driving unit to displace said first part with respect to said second part; and wherein a transmission circuit is connected to the second part side transmission lines of one of the antenna devices, reception circuits are connected to the second part side transmission lines of the other two antenna devices, axes of reception beams of the two antenna devices to which said transmission circuits are connected being different from each other, and an axis of the transmission beam of an antenna device to which said transmission circuit is connected being located approximately at a center of said reception beams to determine a positional relationship between the respective primary radiators and dielectric lenses of said three antenna devices.

8. A transmitting and receiving unit provided with at least two antenna devices, each antenna device comprising a plurality of primary radiators, a plurality of first part side transmission lines respectively coupled with said primary radiators, the first part side transmission lines and primary radiators being provided on a first part, a plurality of dielectric lenses in which a plurality of said primary radiators form approximately focal planes, and a plurality of second part side transmission lines electromagnetically coupled with said first part side transmission lines and being provided on a second part, and a driving unit to displace said movable part with respect to said fixed part; and wherein a transmission circuit and a reception circuit are respectively connected to the second part side transmission lines of said antenna devices, and an axis of a transmission beam of an antenna device to which said transmission circuit is connected is approximately in agreement with an axis of a reception beam of an antenna device to which said reception circuit is connected.

* * * * *